(12) United States Patent
Fulton et al.

(10) Patent No.: US 7,774,253 B1
(45) Date of Patent: Aug. 10, 2010

(54) MARGIN RESERVE IN LENDING (75) Inventors: John A. Fulton, Charlotte, NC (US);
Ryan C. Karaian, Charlotte, NC (US)

(73) Assignee: Bank of America Corporation,
Charlotte, NC (US)

( * ) Notice: Subject to any disclaimer, the term of this patent is extended or adjusted under 35 U.S.C. 154(b) by 303 days.

(21) Appl. No.: 11/680,933

(22) Filed: Mar. 1, 2007

Related U.S. Application Data (60) Provisional application No. 60/863,150, filed on Oct. 27, 2006.

(51) Int. Cl.
*G06Q 20/00* (2006.01)
(52) U.S. Cl. .............................. 705/35; 705/38; 705/39
(58) Field of Classification Search ................... 705/38, 705/35, 39
See application file for complete search history.

(56) References Cited

U.S. PATENT DOCUMENTS

| | | | | |
|---|---|---|---|---|
| 5,083,270 | A * | 1/1992 | Gross et al. ................... | 705/35 |
| 5,237,500 | A * | 8/1993 | Perg et al. ..................... | 705/35 |
| 5,742,775 | A * | 4/1998 | King ........................... | 705/38 |
| 6,654,727 | B2 * | 11/2003 | Tilton ....................... | 705/36 R |
| 2001/0054022 | A1 | 12/2001 | Louie et al. | |
| 2002/0116327 | A1 | 8/2002 | Srinivasan | |
| 2002/0123960 | A1 * | 9/2002 | Ericksen ...................... | 705/38 |
| 2002/0156709 | A1 * | 10/2002 | Andrus et al. ................. | 705/35 |
| 2003/0083972 | A1 * | 5/2003 | Williams ..................... | 705/36 |
| 2004/0030638 | A1 | 2/2004 | Dwin | |
| 2006/0224480 | A1 * | 10/2006 | Bent et al. .................... | 705/35 |
| 2006/0294003 | A1 * | 12/2006 | Snyder et al. ................. | 705/38 |
| 2007/0192226 | A1 * | 8/2007 | Uhlmann et al. .......... | 705/36 R |
| 2008/0027762 | A1 * | 1/2008 | Herzfeld et al. ................ | 705/4 |

FOREIGN PATENT DOCUMENTS

JP  2003216794 A  * 7/2003

OTHER PUBLICATIONS

Spencer, Peter L. How Mortgage Escrows Lock Up Your Money, Mar. 1994 Consumer's Reasearch Magazine, pp. 10-13.*
http://www.fidelityinforservices.com/FNFIS/Markets/ACBS, Fidelity Information Services: ACBS, Copyright 2000-2006, retrieved from the Internet on Mar. 7, 2007, 2 pages.
"A Guide to the Loan Market", Standard & Poor's, Sep. 2006, 51 pages.

* cited by examiner

*Primary Examiner*—Alexander Kalinowski
*Assistant Examiner*—Ann Loftus
(74) *Attorney, Agent, or Firm*—Banner & Witcoff, Ltd.

(57) ABSTRACT

System and methods are disclosed to permit the retroactive application of an interest rate change to a loan. An entity acting as an agent for a loan agreement may allocate a portion of the interest collected on a loan into a margin reserve portion. The reserve amount may be increase or decreased as desired. Furthermore, the agent may hold or distribute the reserve amount according to the compliance, or lack of compliance, of the borrower to certain financial reporting procedures, including the meeting of certain financial goals. A pricing grid or performance grid may be included with the loan agreement to assist in the calculation of interest rate changes and changes to the reserve amount. In addition, traders on the secondary market for loans may minimize the risk of over-payment or under-payment.

15 Claims, 9 Drawing Sheets

Traditional Loan Mechanics
Background:
Assume a $10MM loan.
Bank A is Agent and holds $6MM of the loan.
Bank B is a participant and holds $2MM of the loan.
Bank C is a participant and holds $2MM of the loan.

Interest on LIBOR loans is paid the earlier of contract maturity or every 3 months.
Interest on Base Rate Loans is paid at quarter end.

Simplified Pricing Grid — 102

| Leverage | LIBOR Margin | Base Rate Margin |
|---|---|---|
| >=5.00x | 2.00% | 1.00% |
| <5.00x | 1.75% | 0.75% |

| Date | Event | Payments made by Borrower to Agent | Disbursement to Bank A | Disbursement to Bank B | Disbursement to Bank C |
|---|---|---|---|---|---|
| 1/1/2006 | Borrower starts a 3M Libor Contract @ 5%. Applicable Margin initially set at 2% for an all in rate of 7%. | | | | |
| 3/31/2006 | Libor Contract Matures. Agent invoices for interest from 1/1 to 3/31. Borrower pays agent, Agent disburses to Participants. | $175,000 ($10MM at 7% from 1/1-3/31) | $105,000 ($6MM at 7% from 1/1-3/31) | $35,000 ($2MM at 7% from 1/1-3/31) | $35,000 ($2MM at 7% from 1/1-3/31) |
| 4/1/2006 | Borrower starts a 6M Libor Contract @ 5%. Applicable margin remains 2% for all in rate of 7%. | | | | |
| 4/5/2006 | Borrower delivers financials for 9/30/05-12/31/05 period, shows leverage at 5.75x no change in Applicable Margin. Pricing remains at LIBOR+2%. | | | | |
| 5/15/2006 | Borrower delivers financials for 1/1-3/31 period, shows leverage of 5.40x, no change in Applicable Margin. Pricing remains at LIBOR+2%. | | | | |
| 6/30/2006 | 3 months anniversary of 6 month Libor Contract. Agent invoices for 3 months of interest (3/31-6/30). Borrower pays Agent, Agent disburses to participants. | $175,000 ($10MM at 7% from 4/1-6/30) | $105,000 ($6MM at 7% from 4/1-6/30) | $35,000 ($2MM at 7% from 4/1-6/30) | $35,000 ($2MM at 7% from 4/1-6/30) |

104

| 1A |
|---|
| 1B |
| 1C |

FIG. 1A  — PRIOR ART —

| | | | | | |
|---|---|---|---|---|---|
| 8/15/2006 | Borrower delivers financials for 3/31-6/30 period, shows leverage of 5.10x, no change in Applicable Margin. Pricing remains at LIBOR+2%, for an all-in rate of 7%. | | | | |
| 9/30/2006 | Libor Contract Matures. Agent invoices for interest from 6/30 to 9/30, Borrower pays Agent, Agent disburses to participants. | $175,000 ($10MM at 7% from 7/1-9/30) | $105,000 ($6MM at 7% from 7/1-9/30) | $35,000 ($2MM at 7% from 7/1-9/30) | $35,000 ($2MM at 7% from 7/1-9/30) |
| 10/1/2006 | Borrower starts a 1M LIBOR contract at 4.5%. All in rate if 6.5% (4.5%+2%). | | | | |
| 10/31/2006 | Libor Contract Matures. Agent invoices for interest from 10/1 to 10/31, Borrower pays Agent, Agent disburses to participants. | $54,166 ($10MM at 6.5% from 10/1-10/31) | $32,500 ($6MM at 6.5% from 10/1-10/31) | $10,833 ($2MM at 6.5% from 10/1-10/31) | $10,833 ($2MM at 6.5% from 10/1-10/31) |
| 11/1/2006 | Borrower starts a 1M LIBOR contract at 4.5%. All in rate if 6.5% (4.5%+2%). | | | | |
| 11/15/2006 (106) | Borrower delivers financials for 6/30-9/30 period, shows leverage of 4.90x, Applicable Margin change per pricing grid. Pricing is now LIBOR+1.75%. All in rate of 6.25% (4.5%+1.75%). | $53,125 ($10MM at 6.50% from 11/1-11/15 and $10MM at 6.5% from 11/16 to 11/30) | $31,875 ($6MM at 6.5% from 11/1-1/15 and $6MM at 6.25% from 11/16-11/30) | $10,625 ($2MM at 6.50% from 11/1-11/15 and $2MM at 6.25% from 11/16-11/30) | $10,625 ($2MM at 6.50% from 11/1-11/15 and $2MM at 6.25% from 11/16-11/30) |
| 11/30/2006 | Libor Contract Matures. Agent invoices for interest from 11/1 to 11/30, Borrower pays Agent, Agent disburses to participants. | | | | |
| 12/1/2006 | Borrower starts a 1M LIBOR contract at 4.5%. All in rate if 6.25% | | | | |

| 1A |
|---|
| 1B |
| 1C |

FIG. 1B   - PRIOR ART -

| Date | Description | | | | |
|---|---|---|---|---|---|
| 12/31/2006 | Libor Contract Matures. Agent invoices for interest from 12/1 to 12/31. Borrower pays Agent, Agent disburses to participants. | $52,083 ($10MM at 6.25% from 12/1-12/31) | $31,250 ($6MM at 6.25% from 12/1-12/31) | $10,416 ($6MM at 6.25% from 12/1-12/31) | $10,416 ($6MM at 6.25% from 12/1-12/31) |
| 1/1/2007 | Borrower switches to Base Rate. Base Rate is 5.5%, Base Rate margin is 0.75% for an all in rate of 6.25%. | | | | |
| 2/1/2007 | Borrower switches to 3M LIBOR at 5%. All in rate is 6.75% (5%+1.75% margin). | No payment on base rate is made at this time. Payment will be made at quarter end. | | | |
| 3/31/2007 | Agent invoices borrower for Base Rate borrowing. Borrower pays Agent, Agent disburses to participants. | $52,083 ($10MM at 6.25% from 2/1 to 2/28). No Payment is made on LIBOR contract because it hasn't matured yet. | $31,250 ($6MM at 6.25% from 2/1-2/28). | $10,416 ($6MM at 6.25% from 2/1-2/28). | $10,416 ($6MM at 6.25% from 2/1-2/28). |
| 4/5/2006 | Borrower delivers financials for 9/30/06-12/31/06 period, shows leverage of 4.75%x, no change in Applicable Margin. Pricing remains at LIBOR+1.75%. | | | | |
| 5/15/2006 | Borrower delivers financials for 1/1-3/31 period, shows leverage of 4.50%x, no change in Applicable Margin. Pricing remains at LIBOR+1.75%. | | | | |
| 5/30/2006 | Libor Contract Matures. Agent invoices for interest from 2/1 to 5/30. Borrower pays Agent, Agent disburses to participants. | $168,750 ($10MM at 6.75% from 2/1-5/30. | $101,250 ($6MM at 6.75% from 2/1-5/30). | $33,750 ($6MM at 6.75% from 2/1-5/30). | $33,750 ($6MM at 6.75% from 2/1-5/30). |

FIG. 1C — PRIOR ART —

Sample LIBOR Pricing Grid

| Leverage Ratio | Revolving Credit Loans and Term Loans | Commitment Fee Rate |
|---|---|---|
| <5.0:1 | 1.75% | 0.375% |
| >5.0:1 but <5.5:1 | 2.00% | 0.375% |
| >5.5:1 but <6.0:1 | 2.25% | 0.50% |
| >6.0:1 but <6.5:1 | 2.50% | 0.50% |
| >6.5 | 2.75% | 0.50% |

202

Sample Base Rate Pricing Grid

| Leverage Ratio | Revolving Credit Loans and Term Loans | Commitment Fee Rate |
|---|---|---|
| <5.0:1 | 0.75% | 0.375% |
| >5.0:1 but <5.5:1 | 1.00% | 0.375% |
| >5.5:1 but <6.0:1 | 1.25% | 0.50% |
| >6.0:1 but <6.5:1 | 1.50% | 0.50% |
| >6.5 | 1.75% | 0.50% |

- PRIOR ART -

Applicable Total Margin – Without a Pricing Change — 302
Loan Value: $1,000,000

The margin reserve is an additional accrual that is incurred to handle the retroactive nature of the pricing grid. In one embodiment, the margin reserve will true-up at the end of each quarter to account for any margin changes.

Borrower is initially at the 2% applicable total margin on the pricing grid. Operationally, it would accrue as 1.75% for the margin + 0.25% for the reserve for a total of 2.00%.

LIBOR contract matures. Interest is paid on LIBOR contract and margin. Payment is not made on the reserve.

Borrower reports compliance showing pricing is the same at 2%.

6/30/06 Events
*LIBOR contract matures. Interest is paid on the LIBOR (5% for 1.5M) + the revised applicable margin (1.75% for 1.5M).
*Margin Reserve (0.25% for 3M) is paid and distributed to lenders.

Accruals
|  | 3/31/2006 | 4/1/2006 | 5/14/2006 | 5/15/2006 | 6/30/2006 |
|---|---|---|---|---|---|
| 1.5M LIBOR started on 3/31/06 @ 5% | 5.00% | 5.00% | 5.00% | 5.00% | 5.00% |
| Revised Applicable Margin | 1.75% | 1.75% | 1.75% | 1.75% | 1.75% |
| Margin Reserve | 0.25% | 0.25% | 0.25% | 0.25% | 0.25% |
| All in accrual rate: | 7.00% | 7.00% | 7.00% | 7.00% | 7.00% |

1.5M LIBOR started 5/15 @ 5%

Payment Calculations at 5/14/2006
| 5% LIBOR for 1.5M | 6,250.00 |
| 1.75% Revised Margin for 1.5M | 2,187.50 |
| Margin Reserve Payment | — |
| Total Payment | 8,437.50 |
| Effective Rate on Interest Paid from 4/1 to 5/14 | 6.75% |

Payment Calculations at 6/30/2006
| 5% LIBOR for 1.5M | 6,250.00 |
| 1.75% Revised Margin for 1.5M | 2,187.50 |
| Margin Reserve Payment for 3M | 625.00 |
| Total Payment | 8,437.50 |
| Effective Rate on Interest Paid from 5/14 to 6/30 | 6.75% |

Total Payments During Period
| 4/1-5/14 | 8,437.50 |
| 5/15-6/30 | 9,062.50 |
| Total | 17,500.00 |
| Effective Rate (4/1-6/30) | 7.00% |

| 3A |
|----|
| 3B |

MARGIN RESERVE IN LENDING

RELATED APPLICATIONS

This application claims priority to U.S. Provisional Application No. 60/863,150 entitled "Margin Change Reserve Concept," which was filed on Oct. 27, 2006, and which is herein incorporated by reference in its entirety.

FIELD OF THE DISCLOSURE

Aspects of the disclosure relate to financial obligations. More specifically, aspects of the disclosure relate to retroactive rate adjustment for financial obligations.

BACKGROUND

Companies in need of money look to various sources for funding. Although a plain-vanilla loan from a single bank is one conceivable source of funding, such a source may be inadequate, inefficient, and/or impractical. Since the leveraged buyouts (LBOs) of the 1980s, syndicated loans have become a popular method for companies to raise capital. In particular, large LBOs that require a company to raise a large amount of funds may find a syndicated loan to be a more practical/feasible source of funding than a traditional bilateral or individual credit line.

As a technique for liquidity and risk management, it is common for lenders to use secondary markets to trade loans. However, a lender's ability to trade such loans is hindered by the limited approaches available for administering lending contracts with retroactively adjustable interest rates. In particular, agreements that provide a borrower with the benefit of a retroactive interest rate adjustment encounter setbacks in the secondary sales market. Therefore, a need exists for a technique and system to, among other things, facilitate the equitable sharing of retroactive interest rate adjustments among lenders in a secondary market.

BRIEF SUMMARY

Systems and methods for overcoming various aspects of the prior art are disclosed. For example, a method for administering a syndicated loan agreement involving an agent, lenders, and borrower is disclosed. The loan agreement may include a pricing or performance grid for determining the applicable margin rate of loan. The loan agreement may be administered by recording an initial price for the loan. The initial price may be comprised of a LIBOR (or base rate) amount and a total applicable margin amount. The total applicable margin amount may include a reserve amount. After receiving financials statements of the borrower after a quarter's end, the price of the loan may be adjusted accordingly. The adjustments may be applied retroactively to the start of the quarter or any other specified time period. Thus, the arranger may distribute interest payments accordingly, including the reserve amount.

In addition, a method is disclosed for using a loan configured with a margin reserve amount to enhance a lenders secondary sale of a loan (or part of a loan) to a new lender. The original lender may receive interest payments for the loan, but subsequently transfer ownership in the loan to a new lender. Depending on the pricing changes to the loan, the new lender may or may not receive additional payments for the loan. Meanwhile, the new lender may minimize the risk of having to pay the borrower due to an retroactively adjusted pricing change.

Furthermore, a computer system and a computer-readable medium for implementing methods in accordance with aspects of the disclosure are disclosed. Such a system may include a memory and processor for executing the methods disclosed herein. These are other embodiments of the aspects disclosed herein will become apparent to one skilled in the art after thorough review of the materials disclosed and incorporated by reference herein.

BRIEF DESCRIPTION OF THE DRAWINGS

The present disclosure is illustrated by way of example and not limited in the accompanying figures in which like reference numerals indicate similar elements and in which:

FIG. 1 is a table of events organized in chronological order that describe the mechanics of a syndicated loan arrangement. One or more of the transactions or events (e.g., adjusting pricing, paying agents, disbursing to participants, switching to base rate, switching to LIBOR, etc.) described in FIG. 1 may be enhanced, modified, or eliminated in accordance with one or more aspects of the disclosure;

DETAILED DESCRIPTION

A syndicated loan shares the risks associated with a large loan amount among the numerous lenders/participants (including the agent, assuming the agent holds a portion of the loan). This and other types of loans (and the typical process involved in structuring and managing them) are discussed in the materials incorporated by reference earlier. One of skill in the art will appreciate that one or more of these types of loans may be enhanced, modified, or eliminated in accordance with one or more aspects of the disclosure.

An arranger structures (e.g., creates) and manages (e.g., collects payments, disburses payments, adjusts pricing, and tracks loan trades) a syndicated loan. The arranger may be a commercial bank, an investment bank, or any other entity/person prepared to act as an agent (e.g., syndication agent, administrative agent, etc.) of the syndicated loan. An arranger may collect a fee for structuring and/or managing the syndicated loan. Furthermore, the arranger may identify lenders (or participants, assignee, etc.) for the syndicated loan. Lenders may include other banks, institutional investors, financing companies, or any other entity/person that may legally join the syndication. Depending on the type of syndication, a lender may buy into (or commit to) a portion of the total syndicated loan amount. The arranger/agent may be responsible for accepting payment from the borrower (i.e., company and/or person borrowing funds) and disbursing the payment among the participants. Additional information about lender roles in a syndicated deal, fees, common syndicated loan structures and products, and the syndication process are discussed in materials incorporated by reference in this disclosure.

FIG. 1 is a table 100 of events organized in chronological order describing the mechanics of an illustrative syndicated loan arrangement. One skilled in the art will appreciate that one or more of the transactions/events (e.g., adjusting pricing, paying agents, disbursing to participants, switching to base rate, switching to LIBOR, etc.) shown in FIG. 1 may be enhanced, modified, or eliminated in accordance with one or more aspects of the disclosure.

In a syndicated loan, the interest spread over or under a benchmark rate (such as LIBOR, Euribor, or a base rate) is commonly referred to as the applicable margin amount. The most common underlying benchmark rate in a loan facility is the rate quoted by the London InterBank Offering Rate ("LIBOR"). LIBOR rates vary among various tenors such a 1-month, 2-month, 3-month, and 6-month LIBOR. The applicable margin is then applied to the underlying benchmark to comprise the total interest rate (or price) a borrower pays on a loan. For example, a 1-month LIBOR contract with an underlying rate of 5.00% and an applicable margin of 2.00% will result in a total interest rate of 7.00%. In one illustrative embodiment, borrowers may pay interest (the benchmark plus applicable margin) at the earlier of maturity (i.e., expiration) of a LIBOR contract (1-month, 2-month, etc.) or on the 3-month anniversary of the contract (e.g., an illustrative 6-month LIBOR contract may be paid after 3 months and then again at maturity).

It is commonplace for the applicable margin, as a result of changes in the borrower's financial position, to become effective from the time of delivery of the financial information going forward. Changes in the applicable margin may become effective on the date on or after delivery of financial statements for the preceding period or upon disclosure of a change in public debt ratings. The delivery of financial statements sometimes lags the end of the fiscal period by several weeks or months (e.g., 90 days for the year-end or fourth fiscal quarter and 45 days for the first, second and third fiscal quarters.) For example, a borrower with a fiscal year-end of December 31 might not deliver financial statements covering the period ending December 31, until March 31 of the following year. Further, the financial statement for the first fiscal quarter ending March 31, might not be delivered until May 15.

Figure 2:
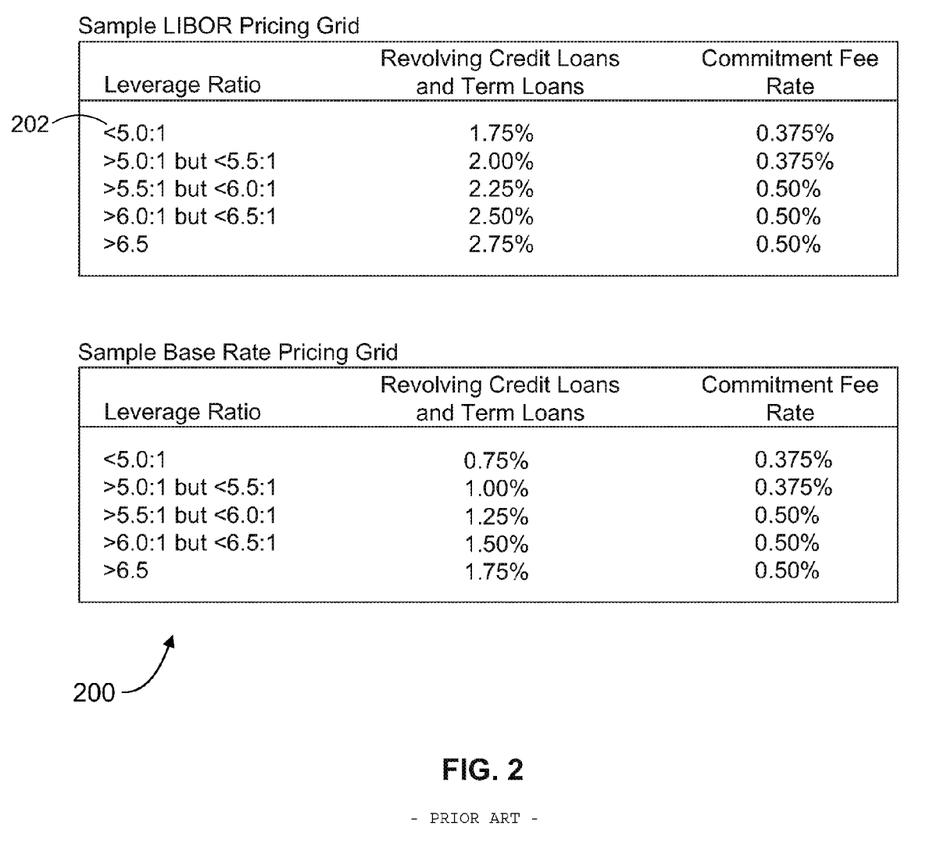
FIG. 2 is just one example of a pricing grid in accordance with aspects of the disclosure.

In accordance with aspects of the disclosure, the applicable margin amount may be governed by a pricing (or performance) grid under which the applicable margin amount may increase, decrease, or remain unchanged based on changes (or lack thereof) to certain criteria impacting a borrower's credit profile (e.g., criteria such as total leverage, senior leverage, debt-to-equity ratio, and other appropriate ratios or indicators). An illustrative pricing grid 200 based on a leverage ratio is illustrated in FIG. 2. The illustrative pricing grid 200 of FIG. 2 may be based on one or more of many different indicators. For example, the leverage ratio may be based on the debt to capitalization ratio or debt to EBITDA (earnings before interest tax depreciation and amortization). EBITDA is an indicator of a company's financial performance and profitability. The pricing grid may be based on other ratios or indicators in other embodiments in accordance with the disclosure. For example, the pricing grid may be based on any financial ratios (such as fixed charge coverage ratio or debt service coverage ratio), public debt/credit ratings provided by Standard & Poor's, Moody's, Fitch, or any other similar provider. Furthermore, the grid may be based on other indicators (e.g., market conditions, borrower performance, etc.) that, for example, adjust the pricing of the loan according to the total number of subscribers the borrower has registered at the end of a quarter (or other interval of time). Such criteria may be included in the agreement (e.g., syndicated loan agreement) through the use of, for example, market-flex language and pricing/performance grids. In addition, the pricing grid may provide adjustments at any of a number of different incremental steps (e.g., 25 bps as in FIG. 2, 50 bps, 100 bps, 15 bps, etc.)

Using the illustrative LIBOR pricing grid 200 in FIG. 2 and assuming that as the result of financial statements delivered for the third quarter ending September 30th, a borrower currently pays interest with an applicable rate of 2.00% as a result of a total leverage ratio of 5.25×. Assume the same borrower delivers its financials for the fiscal year-ending December 31 on March 31 of the following year and such financials indicate that the borrower's total leverage ratio as of December 31 was 4.90×. As illustrated by the LIBOR pricing grid 200 in FIG. 2, a ratio of 4.90× would result in an applicable margin of 1.75% (see 202). However, prior to delivery of the year-end financial statements, the borrower would have paid or accrued interest at an applicable margin rate of 2.00% from January 1 through March 31, despite the fact that during this period the actual total leverage ratio was only 4.90×. An industry standard that handles changes in the applicable margin as just described (and further outlined in FIG. 1) creates a mismatch in terms of actual financial risk and the applicable margin paid by the borrower.

For example, a borrower may enter into a 3 month LIBOR (London Interbank Offered Rate) contract at 500 basis points (bps). The applicable margin for the 3-month LIBOR contract may be set at 200 bps for an all in rate of 700 bps. Referring to the sample simplified pricing grid in FIG. 1, the grid 102 indicates that the margin for the LIBOR contract is 200 bps, assuming the leverage ratio is greater than or equal to 5.00×. The arranger/agent adjusts the pricing of the LIBOR contract (e.g., on January 1, 2006 the illustrative 3-month LIBOR contract 104 in FIG. 1 is priced at 500 bps) according to the borrower's financial statements. The financial statements may be delivered quarterly (or at any other predetermined interval of time). In this example, the agent bank analyzes the borrower's financial statements for the 4th quarter of 2005 and determines that the financial statements show that the leverage ratio is 5.75×. According to the pricing grid, the higher leverage ratio falls within the same range as before. Therefore, in this case, the pricing of the loan agreement (e.g., 3 month LIBOR contract) remains at LIBOR plus 200 bps.

In another example in FIG. 1, on Nov. 15, 2006 the applicable margin on the LIBOR contract 106 is adjusted as delivery of the financials for the quarter ending September 30$^{th}$ show the borrower's leverage ratio is 4.90×. The lower leverage qualifies the borrower for reduced pricing under the illustrative pricing grid discussed above. Therefore, the margin value is reduced from 200 bps to 175 bps on the LIBOR contract going forward. As a result, on Nov. 30, 2006, the borrower pays at 6.5% for the first half of November 2006 and only 6.25% for the second half of November 2006. Subsequently, the agent/arranger disburses the payment, which was received from the borrower, to the lenders (e.g., bank A (itself), bank B, and bank C). In these examples, however, the pricing on the agreement is only effective going forward from the date when the financial statements are provided. In other words, the adjusted pricing of the loan is not retroactively applied to the start of the quarter.

In an alternative embodiment, the interest rate and applicable margin may be adjusted for a future period such that the borrower is credited (or debited) for the applicable margin level it should have paid during the prior period. At least one issue with this change to the applicable margin is that, for example in the case of syndicated loans, the loans may be traded in a marketplace (e.g., secondary sale market). Thus, there is a risk that a lender may sell its loan position after receiving an interest payment, but before the delivery of financial statements, where the latter delivery results in a reduction of the applicable margin (such as a reduction from 2.00% to 1.75%). The borrower in such a situation would expect to receive a credit for an overpayment of interest during the quarter, with such credit applied to the next interest bill. However, with such an approach the lender that sold its position in total is essentially overpaid and the lender who purchases the position will bear the burden of the credit to the borrower, thus lowering its effective rate of return.

In accordance with aspects of the disclosure, a margin reserve may be used to retroactively apply changes in applicable margin to the start of an interval of time (e.g., to the start of a fiscal quarter). Thus, minimizing, among other things, a mismatch and/or lag effect. Pricing adjustments to a borrower's loan may be applied retroactively, in one example, to the beginning of the fiscal period to which the financial statements delivered correspond. Alternatively, pricing adjustments to a borrower's loan may be applied retroactively, in another example, to the beginning of the subsequent fiscal period to which the financial statements delivered correspond. A reserve amount may be maintained to cover any overpayment or underpayment due to pricing adjustments, and the reserve is accounted for (e.g., a "true-up" payment) at the end of the pending quarter or shortly after receipt of information (e.g., financial statements, financial ratios, performance results, etc.) detailing what pricing should have prevailed during the period in question. Additionally, aspects of the disclosure allow a loan to trade equitably in a secondary market while eliminating the risk of any over-payment or under-payment by the trading parties (e.g., lenders, participants, assignees, etc.) These and other aspects of the disclosure are described by example using the accompanied illustrative figures (e.g., FIG. 3 and FIG. 5).

Figure 3B:
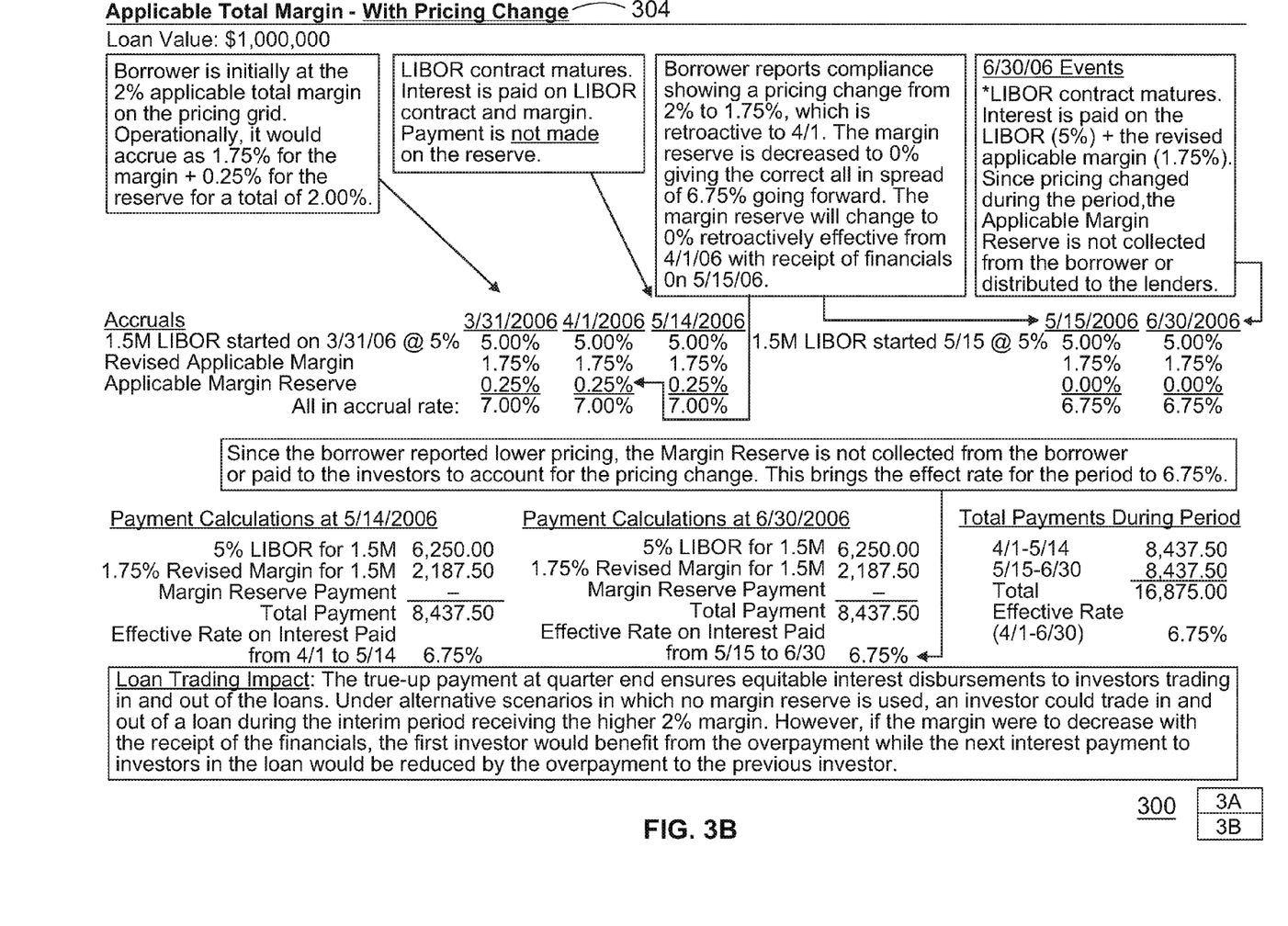
FIG. 3 is a spreadsheet of events, in accordance with aspects of the disclosure, for two illustrative syndicated loans: one showing a pricing change, and the other without a pricing change. One or more of the events described in FIG. 3 may be enhanced, modified, or eliminated in accordance with one or more aspects of the disclosure.

In accordance with aspects of the disclosure, FIG. 3 shows an example (see 300) of transactions relating to an illustrated syndicated loan where invoicing of borrower payments may be done on an accrual basis. In one example, a borrower of a syndicated loan arrangement may make payments on a quarterly basis (or other predetermined interval of time, e.g., annually, monthly, etc.) or at the expiration of a loan contract (e.g., 2-month LIBOR contract), whichever comes first. In the case of base rate loan contracts, the arranger/agent may desire to collect payment on a quarterly basis in some instances.

Referring to the example (see 302) near the top of FIG. 3, on Mar. 31, 2006 a borrower initiates a 1.5 month LIBOR contract at 500 bps. The total applicable margin on the contract totals 200 bps. However, the total applicable margin amount is divided and labeled into a margin amount of 175 bps and a margin reserve amount of 25 bps. Thus, the "all in" accrual rate remains the same as before at 7.0%, which is LIBOR plus a 2% total applicable margin. The initial price of the loan may be recorded (in step 502) in the LIBOR contract either expressly or in the form of a pricing grid with associated financial information. Assuming the 1.5 month LIBOR contract matures (i.e., expires) on May 14, 2006, the borrower pays the interest on the LIBOR contract plus the margin of 175 bps. However, the 25 bps attributed to the margin reserve amount is held in reserve. Therefore, the effective rate of interest paid from April 1 to May 14, 2006 is 6.75%.

In one embodiment in accordance with aspects of the disclosure, the borrower pays the entire interest amount (e.g., 500 bps plus 175 bps plus 25 bps) amount to the arranger (e.g., syndication agent) when interest is normally due. However, the arranger disburses only the LIBOR portion (e.g., 500 bps) and margin portion (e.g., 175 bps) of the payment collected. Meanwhile, the arranger maintains the margin reserve portion (e.g., 25 bps) in an account for safekeeping until the appropriate time. In another embodiment, the borrower pays only the LIBOR portion and margin portion of the payment at the time when interest is normally due. Meanwhile, the borrower may hold (in accordance with language in the syndication loan agreement) the margin reserve portion for safekeeping until the appropriate time. In such an embodiment, however, one skilled in the art will appreciate that the borrower may be asked (or required) to act as a fiduciary on behalf of the lenders/arranger in holding the margin reserve portion for safekeeping.

Returning to the example in FIG. 3, the borrower next delivers its financial statements, per the requirements of the agreement, on May $15^{th}$. The arranger receives the information (e.g., financial statements) and uses it in combination with the pricing grid to determine (in step 504) the adjusted price of the loan. Assuming these financial statements correspond to the fiscal period that ends on March $31^{st}$ and show that the company is entitled to a 2% margin rate over LIBOR per a predetermined pricing grid (such as FIG. 2). The pricing grid permits a lender to adjust pricing dependent on some ratio or other indicator tracking the performance and/or general profitability/health of a borrowing entity. In FIG. 2, the pricing grid shows that for a LIBOR contract, a leverage ratio between 5.0× and 5.5× assigns a total applicable margin rate of 2.0%. In addition, other pricing, such as commitment fee, may also be tracked using a pricing grid or similar tool. A commitment fee may be a fee charged by a lender as consideration for making a loan available to a prospective borrower.

Since the pricing of the loan in this example does not change, payments continue to accrue at the same interest rate as before (i.e., 7%). When the fiscal quarter concludes on June $30^{th}$, the agent/arranger of the syndicated loan may collect payment from the borrower and disburse (in step 512) the appropriate amount to each lender (or participant) and itself (assuming the arranger is a lender in the syndication agreement). At this time, the LIBOR contract has matured (i.e., expired), therefore, the amount accrued during the entire quarter in the margin reserve is distributed too. Thus, effectively the lenders receive 7% for the entire time of the loan, which is the correct margin amount. In this case, the margin reserve may be distributed at such a time because no pricing change was necessary. Thus, the borrower did not overpay during the immediately prior period.

However, in some situations, the pricing of the loan may change due to a change in the leverage ratio (or other predetermined indicator) of the borrowing company. In the example (see 304) near the bottom of FIG. 3, an example in accordance with aspects of the disclosure is shown where pricing changes due to a change in the borrower's leverage ratio. On May $14^{th}$, like before, the margin reserve amount is held in reserve until the end of the quarter. However, in this example, the pricing of the loan agreement is reduced from 2% (200 bps) to 1.75% (175 bps), per the pricing grid, because the borrower's leverage ratio improved as reflected in their newly delivered financial statements of May $15^{th}$ (see step 504). Consequently, no payment is accrued on the reserve amount because the total applicable margin rate is at 175 bps instead of 200 bps. At the end of the quarter (and upon maturity of the LIBOR contract) on June $30^{th}$, all lenders will effectively be paid LIBOR plus 175 bps. Additionally, the borrower benefits as the lower pricing is effective as of April 1 (see step 506), whereas under traditional methods the pricing is not easily retroactively changed with receipt of the financials on May 15$^{th}$.

In another example, the borrower's financial statements may indicate that the leverage ratio of the borrower has increased such that the pricing grid indicates that the margin rate should be increased. In that example, the margin reserve would be fully distributed at the end of the quarter. However, since the pricing increased, at the end of the quarter when the borrower is invoiced for the higher interest rate, that money that is collected would be distributed accordingly. For example, a lender that sold off its interest in the loan earlier in the quarter may be sent additional funds to cover their share of the increased pricing.

In one example, the margin reserve may be treated effectively almost like a fee, although it is part of the interest payment. Similar to some fee structures, the margin reserve amount may be payable quarterly and/or after the financials are due. In this way, depending on adjustments to the leverage ratio (hence pricing), the margin reserve may be eliminated, reduced, or increased as appropriate. Therefore, in this one example, even if a lender participated in three consecutive, one-month LIBOR contracts, the lenders are paid the margin reserve amount, if at all, at the end of the quarter only after information (e.g., financial statements) is delivered and the appropriate applicable total margin rate is determined and applied on a retroactive basis.

In another example, if the borrower is late or in non-compliance with the reporting requirements relating to information (e.g., financial statements and/or other reporting), the borrower may forfeit the margin reserve; hence, any benefit of a retroactively applied interest rate. For example, if a borrower fails to report financials within a predetermined amount of time (e.g., 30 days after the end of the borrower's fiscal quarter), any benefits from a lower retroactive pricing for the prior quarter may be forfeited. Thus, the margin reserve amount may be automatically distributed to the lenders. In other examples, this aspect of the disclosure may be implemented in other ways, such as through a penalty fee or other form of penalty to the borrower.

Moreover, the agreement (e.g., loan syndication agreement) may expressly contain language setting time restrictions (e.g., 30 days) for a borrowing entity to report information after the end of a predetermined interval of time (e.g., a fiscal quarter) before the borrowing entity is deemed in non-compliance. Once deemed in non-compliance, the borrowing entity may not retroactively reduce the pricing of the loan corresponding to the predetermined interval of time. Thus, in accordance with aspects of the disclosure, the arranger may distribute the margin reserve amount to the lenders at that time. Alternatively, the margin reserve amount may be withheld from disbursement until a later triggering event (such as the maturity of a LIBOR contract).

Figure 5:
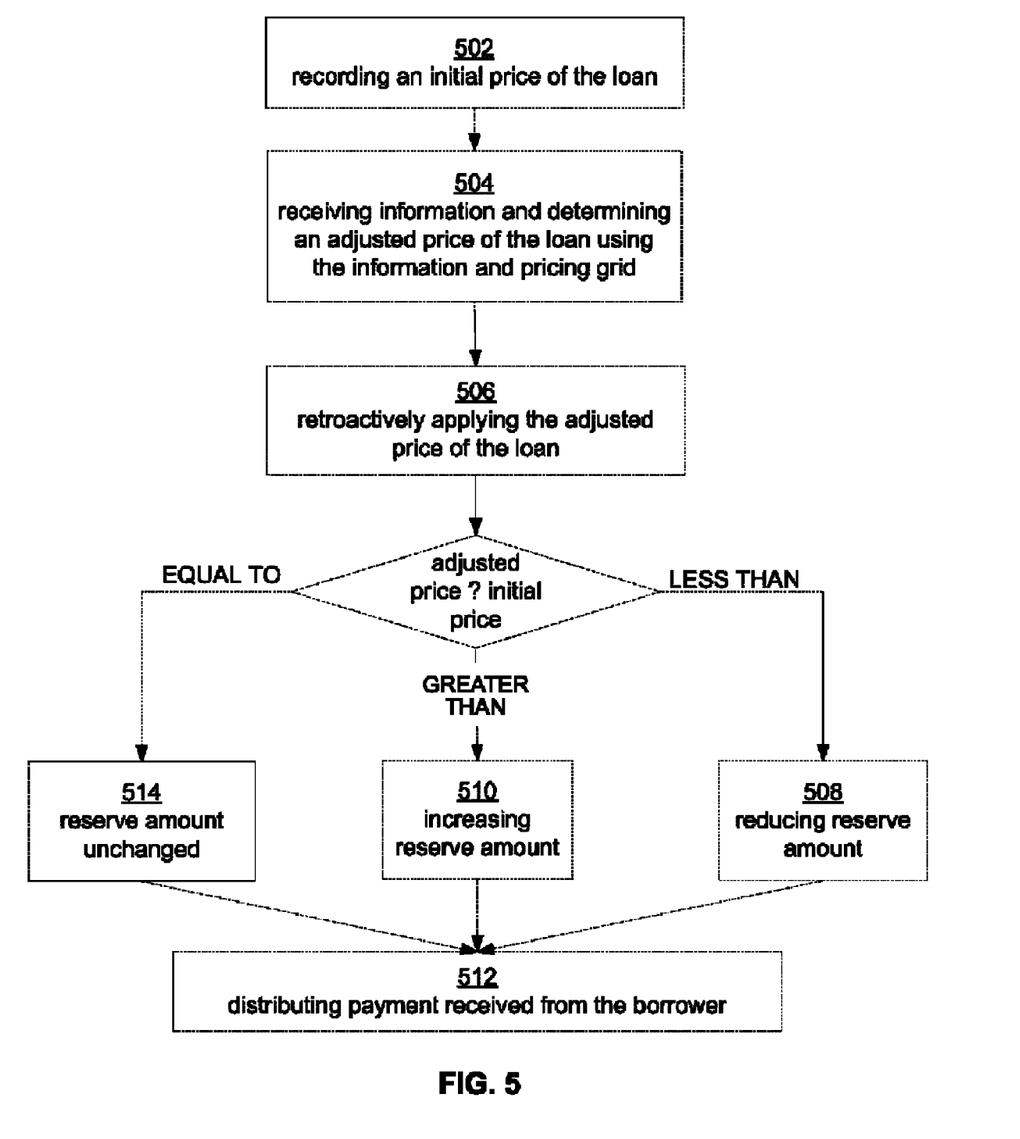
FIG. 5 is a flowchart illustrating steps performed during methods in accordance with aspects of the disclosure.

In accordance with aspects of the disclosure, a syndicated loan agreement or credit agreement may include contractual provisions for the margin reserve, retroactively applied pricing, and other aspects of the disclosure. In just one example, the agreement may establish that the basis point level in the margin reserve for any type of loan (e.g., term loan, revolver, letter of credit (LOC), facility, etc.) may be established at a predetermined interval of time (e.g., quarterly, monthly, annually, etc.). This basis point level, in one example, may be 25 bps per annum of the principal amount of the loan. The basis point level may be determined using a pricing grid, such as the one illustrated in FIG. 2. Subsequently, the basis point level of the margin reserve may be adjusted according to various factors. In one example, the basis point level of the margin reserve may be adjusted depending on the financial performance (or other indicators) of the borrower entity using a pricing grid. The pricing grid may vary according to the type of loan. For example, in FIG. 2, a pricing grid is provided for LIBOR contracts and another is provided for base rate loans. As is evident from FIG. 3, the basis point level of the total applicable margin rate varies for each entry or step in the pricing grid. The margin reserve rate may be similarly varied using a pricing grid that may be based on leverage ratio, debt-to-EBITDA ratio, other indicators, or a combination of these. In one example, the reserve amount may be reduced (in step 508) if the adjusted price of the loan (as a result of receiving financial information and determining and adjusted price) is less than the initial price of the loan. In another example, the reserve amount may be increased (in step 510) if the adjusted price of the loan (as a result of receiving financial information and determining and adjusted price) is greater than the initial price of the loan. In yet another example, the reserve amount remain unchanged (in step 514) if the adjusted price of the loan is the same as the initial price of the loan. One skilled in the art will appreciate that the language may be included in the agreement (or by amendment to the agreement) to indicate when and by what quantity the margin reserve amount may be adjusted under different circumstances. Therefore, in some instances, an increase in the price of a loan will not necessarily lead to an increase in the reserve amount.

In addition, the agreement may establish that at each regular interval of time, the accrued interest is disbursed to the agent and lenders. The total payment disbursed may be increased or decreased according to any adjustments in the margin reserve amount and/or total applicable margin amount due to changes in the pricing of the loan. As explained above, the pricing of the loan may be adjusted retroactively to the first day of the predetermined interval of time (e.g., quarter of year) to reflect changes in the financials of the borrower entity. The pricing change is retroactively applied; thus, the margin reserve may be adjusted in accordance with aspects of the disclosure. One skilled in the art will appreciate that one or more steps in FIG. 5 may be optional and the depiction of the order of the steps in the figure represents only one example (i.e., the steps may be re-ordered as would be apparent to one skilled in the art). For example, an arranger may distribute payment (step 512) immediately after receiving payment from the borrower, which may occur in one example after step 502. Of course, the nature and extent of the distribution may vary accordingly (i.e., the payment distributed may not include the reserve amount since the borrower's may still have time to show that it is entitled to a lower adjusted price of the loan due to good performance results for the quarter).

A loan agreement may establish that information may be used in combination with a pricing grid to determine an adjusted margin rate only after the borrower's financials are delivered to the agent/arranger and an officer of the borrowing entity executes a compliance certificate (or similar form). Such a compliance certificate may be used to confirm that the financials provided by the borrowing entity are true and accurate. The agreement may also indicate the types of information (e.g., financial statements) the borrowing entity will be required to provide to the agent (e.g., lead bank). As explained earlier, failure on the part of the borrowing entity to comply with reporting requirements of a loan agreement may cause the borrowing entity to forfeit the margin reserve amount and benefits of retroactive pricing.

The loan agreement may also establish that any repayment of the debt shall be in the same currency as borrowed. In addition, the agreement may establish when the borrowing entity is required to submit payment. For example, with respect to base rate loans, payments may be made quarterly. In another example, LIBOR loans may be paid quarterly and/or at maturity. One of ordinary skill in the art will appreciate that the examples above are just a few example of many possible aspects of a loan agreement in accordance with aspects of the disclosure. For example, one or more definitions may be modified and other features/aspects may be added/removed from the above examples. Although aspects of the disclosure are described above using examples of syndicated lending facilities or loans, aspects of the disclosure may be applied to any loan, debt, or financial instrument in which pricing may change depending on financial performance or other factors, and it is desirable to retroactively apply the adjusted price.

In addition, aspects of the disclosure may be applied only to upward or downward changes in the interest rate, or could apply to both. Moreover, the changes in the applicable total margin rate (or margin reserve rate) may be capped at certain amounts. One skilled in the art will appreciate that there may be other derivations and modifications to the techniques disclosed herein that are apparent after thorough review of the entirety disclosed herein.

At least one benefit of separating the total applicable margin into a reserve and a non-reserve (i.e., regular) portion, where that interest reserve is only paid at quarter end (other than, in some examples, in the case of the first quarter), is the reduction in risk of over-payment to any lender. In situations where loan contracts/agreements are being traded on a secondary market, such techniques are particularly beneficial. In one example, interest payments are invoiced to the borrower after the adjusted pricing is determined on a retroactive basis. When trades are done in the secondary market, any interest/fees that are not paid are traded on an accrued basis. So there is minimal risk that a participant has received too much interest or has been over-paid before leaving the loan transaction. Thus, among other things, enhancing the liquidity of loan contracts/agreements on the secondary market.

Figure 6:
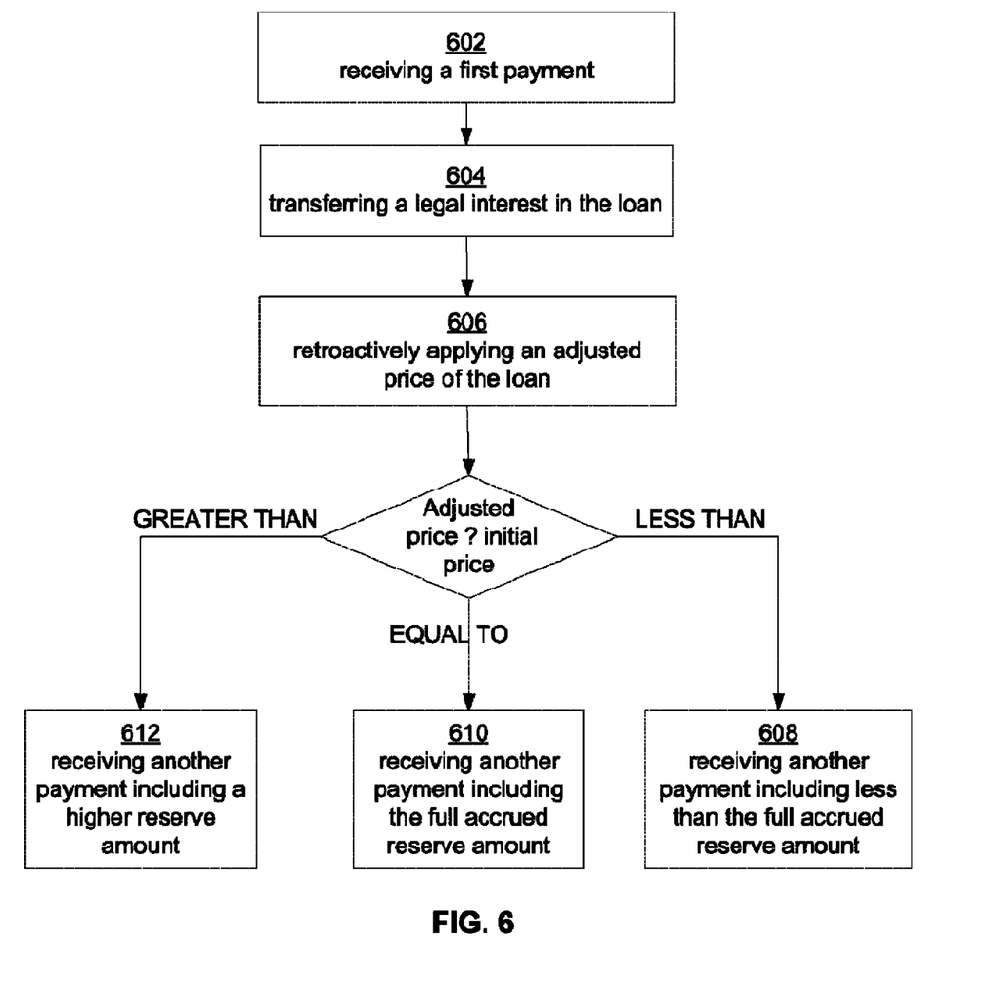
FIG. 6 is a flowchart illustrating a method for trading loans as secondary sales in accordance with aspects of the disclosure.

Referring to FIG. 6, one example of a method for trading a legal interest or ownership (e.g., a paper, such as commercial paper, debt instruments, etc.) in a syndicated loan agreement in accordance with aspects of the disclosure is illustrated. An original lender of a loan may transfer (in step 604) its ownership in the loan (i.e., loan agreement) as a secondary sale to a new lender. In the case where the original lender has already received (in step 602) an interest payment for the loan, the new lender risks that it is being over-paid or under-paid for its transferred ownership in the loan. For example, if the borrower is able to provide financial information within the predetermined period of time allocated (e.g., 30 days after the end of a fiscal quarter) that indicates that the borrower is entitled to a retroactively applied lower interest rate, then the arranger/agent of the loan agreement, in accordance with aspects of the disclosure, may retroactively apply the adjusted price of the loan (in step 606). In situations where the pricing of the loan is not retroactively adjusted lower, the original lender may receive (in step 610) another payment from the arranger. The additional payment may include the reserve amount that accrued during the prior quarter (or other interval of time). In situations where the pricing of the loan is retroactively adjusted higher, the original lender may receive (in step 612) another payment from the arranger. The additional payment may include a reserve amount greater than that accrued during the prior quarter (or other interval of time) to account for the higher adjusted price of the loan. However, in situation where the pricing of the loan is retroactively adjusted lower, the original lender may receive (in step 608) a payment that is less than the total reserve amount that accrued during the prior quarter (or other interval of time) because a portion of the reserve amount may be returned (e.g., need not be paid, or may be simply returned if already paid) to the borrower.

Further aspects of the disclosure may use a computer system to assist in the implementation of aspects. For example, a loan system, such as the ACBS system by Fidelity National Information Systems, Inc. may be provided with computer-executable instructions stored on a computer-readable medium to implement and/or assist in the implementation of aspects of the disclosure. For example, on a revolving loan a borrower pays a fee (e.g., unused fee). The computer system may be used to track and monitor such fees. In addition, the computer system may track the accrual of fees (and interest), and may be used to implement one or more aspects of the margin reserve.

Figure 4:
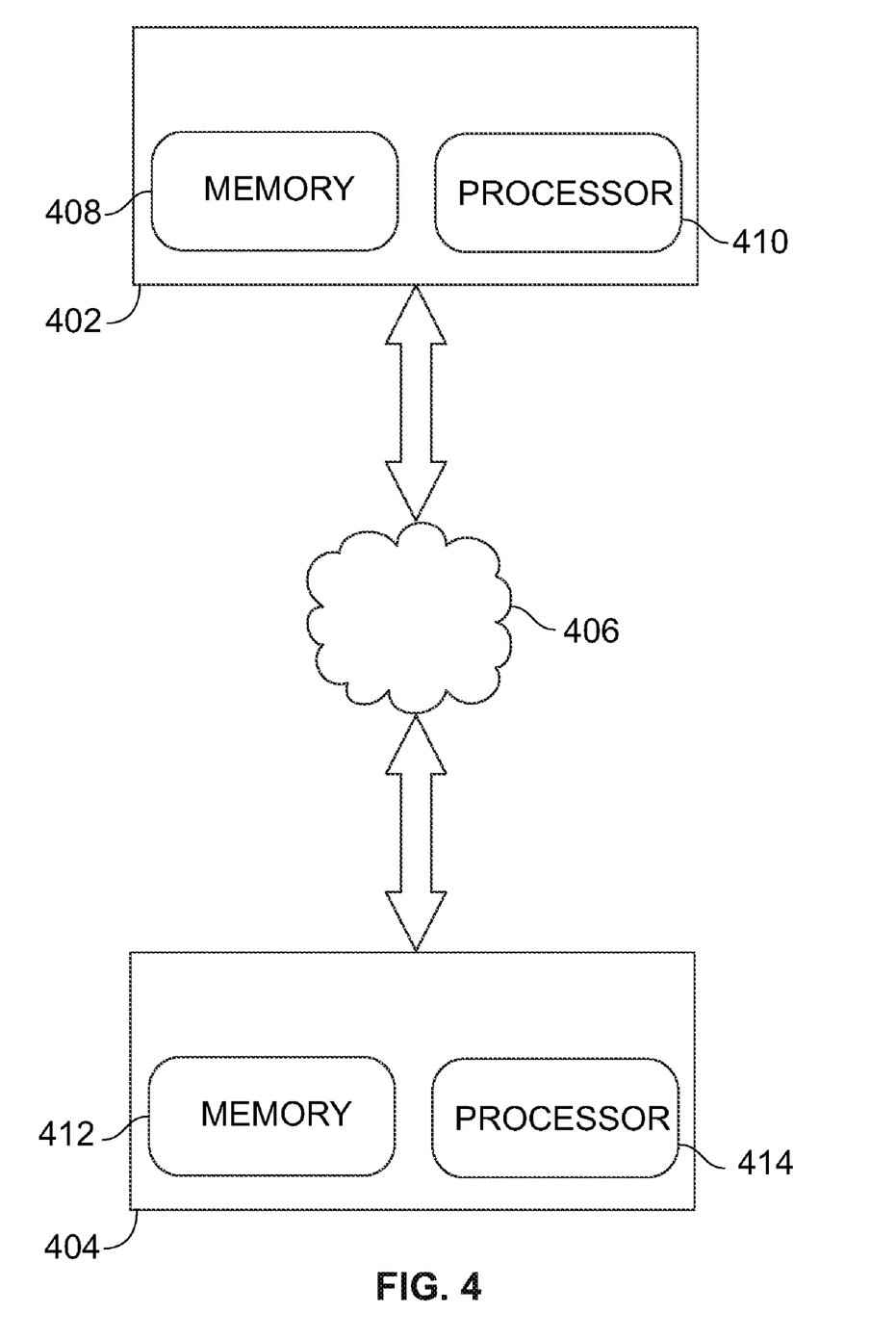
FIG. 4 is a diagram of an illustrative operating environment for a system performing methods in accordance with aspects of the disclosure.

In accordance with aspects of the disclosure, one or more computers 402, 404 may be connected through a network 406 and/or the Internet to provide a system for implementing aspects of the disclosure, including, but not limited to, the aforementioned loan system. One skilled in the art will appreciate that the computers 402, 404 depicted in FIG. 4 may be substituted for other computing devices such as laptops, mobile devices, personal digital assistants with communication capabilities, and other electronic devices with a memory 408, 412 and processor 410, 414. For example, a conventional workstation with random access memory (RAM) and a high-speed microprocessor may be used for computer 402. Memory 408, 412 may store computer-executable instructions for execution by the processor 410, 414 in accordance with aspects of the disclosure. The memory 408, 412 may also store a pricing grid 200 for use in determining the price of a loan in accordance with aspects of the disclosure.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Although illustrative embodiments in accordance with aspects of the disclosure are disclosed above, one skilled in the art will appreciate that a computer system is not necessary in all embodiments of the disclosure. Rather, aspects of the disclosure may be embodied without the use such a computer system. For example, one or more method claims recited below do not require the technological arts of a computer system in order to be performed.

Aspects of the disclosure may be generally applied to a financial obligation. Examples of financial obligations include, but are not limited to, a loan (e.g., syndicated loan), revolver, evergreen facility, credit line, lease, letter of credit, or other obligations of a lender or other entity. One skilled in the art will appreciate that aspects of the invention may be applied to any financial instrument where the interest rate or price is adjustable.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures (and/or described above) may be performed in other than the recited order, and that one or more steps may be optional in accordance with aspects of the disclosure. The above disclosure presents a simplified summary of the disclosure in order to provide a basic understanding of some aspects.

We claim:

1. A method for administering, using a computer loan system, an agreement relating to a loan having an arranger, lenders, and a borrower, the method comprising:
at time $t_1$, recording, on memory in the computer loan system, an initial price of the loan corresponding to the agreement, the initial price of the loan comprising a reserve rate;
at time $t_3$, receiving, at the computer loan system, information for use with a pricing grid recorded on the memory in the computer loan system, where the information comprises a report of the borrower's financial status for use with the pricing grid;
determining, using a processor of the computer loan system, an adjusted price of the loan using the information and the pricing grid;
applying the adjusted price of the loan for a period of time starting at a time $t_2$ and ending at the time $t_3$, where the time $t_2$ is earlier than the time $t_3$;
determining that the adjusted price of the loan is not less than the initial price of the loan; and
at time $t_3$, requesting distribution of a reserve amount of the loan that accrued at the reserve rate for a period of time ending prior to the time $t_3$, in accordance with the adjusted price of the loan.

2. The method of claim 1, the initial price of the loan comprising a LIBOR rate and a total applicable margin rate, where the reserve rate is a predetermined portion of the total applicable margin rate.

3. The method of claim 1, the initial price of the loan comprising a base rate, a margin rate, and the reserve rate.

4. The method of claim 1, the agreement comprising a syndicated loan agreement.

5. The method of claim 1, where the time $t_2$ is later than the time $t_1$, and the time $t_2$ is at an integer multiple of a predetermined interval of time after the time $t_1$.

6. The method of claim 1, further comprising, increasing the reserve rate in response to determining that the adjusted price of the loan is greater than the initial price of the loan.

7. The method of claim 1, further comprising, distributing a reserve amount of the loan that accrued at the reserve rate for a period of time ending prior to the time $t_3$, in accordance with the adjusted price of the loan, where the distribution of the accrued reserve amount is to the lenders.

8. A computerized system comprising: a processor, and a memory storing computer-readable executable instructions that when executed cause the system to perform steps comprising:
at time $t_1$, recording an initial price of a loan corresponding to an agreement, the initial price of the loan comprising a reserve rate;
at time $t_3$, receiving information for use with a pricing grid, the pricing grid being stored in the memory, where the information comprises a report of the borrower's financial status for use with the pricing grid;
calculating an adjusted price of the loan using the information and the pricing grid, where the adjusted price of the loan is not less than the initial price of the loan;
applying the adjusted price of the loan for a period of time starting at a time $t_2$ and ending at the time $t_3$, where the time $t_2$ is earlier than the time $t_3$; and
requesting distribution of a reserve amount accrued at the reserve rate for a period of time from the time $t_1$ to the time $t_2$, in accordance with the adjusted price of the loan.

9. The system of claim 8, where the steps further comprising, reducing the reserve rate in response to determining that the adjusted price of the loan is less than the initial price of the loan.

10. The system of claim 8, where the steps further comprising, increasing the reserve rate in response to determining that the adjusted price of the loan is greater than the initial price of the loan.

11. The system of claim 8, where the steps further comprising, transmitting payment to a lender's account information when the information for use with the pricing grid is not received at the system within a predetermined amount of time after the time $t_2$.

12. The system of claim 8, where the steps further comprising, transmitting payment to a lender's account when the adjusted price of the loan is greater than the initial price of the loan.

13. The method of claim 1, where the reserve amount requested for distribution is that which accrued at the reserve rate from the period of time from the time $t_1$ to the time $t_2$.

14. A computer-assisted method for use with a computer loan system, the method comprising:
receiving, at the computer loan system, funds from a borrower's account, where the funds correspond to interest payments for a period of time starting at a time $t_1$ and ending at a time $t_2$, and where a reserve amount is a portion of the funds received from the borrower's account and is based on a reserve rate of the borrower's loan;
crediting, using a processor of the computer loan system, the reserve amount into a reserve account;
at time $t_3$, debiting, using the processor of the computer loan system, the reserve amount from the reserve account, where the time $t_3$ is after the time $t_2$; and
crediting, using the processor of the computer loan system, a first portion of the debited reserve amount to the borrower's account and a second portion of the debited reserve amount to at least one lender's account;
where the first portion of the debited reserve amount is zero when information about the borrower's financial status indicates that an adjusted interest rate of the borrower's loan calculated at the time $t_3$ is not less than an interest rate of the borrower's loan at the time $t_2$, where the adjusted interest rate of the borrower's loan calculated at the time $t_3$ is based on the information about the borrower's financial status and a pricing grid.

15. The method of claim 14, where the time $t_1$ is the start of a quarter and the time $t_2$ is the end of the quarter, and the interest payments on the borrower's loan are based on at least the reserve rate and a margin rate, where the margin rate is recalculated based on a pricing grid.

* * * * *